United States Patent
Dehmer

(10) Patent No.: US 9,555,823 B2
(45) Date of Patent: Jan. 31, 2017

(54) INFANT SEAT SUPPORT

(71) Applicant: Rachel Dehmer, Corcoran, MN (US)

(72) Inventor: Rachel Dehmer, Corcoran, MN (US)

( * ) Notice: Subject to any disclaimer, the term of this patent is extended or adjusted under 35 U.S.C. 154(b) by 0 days.

(21) Appl. No.: 14/727,291

(22) Filed: Jun. 1, 2015

(65) Prior Publication Data

US 2015/0344057 A1    Dec. 3, 2015

Related U.S. Application Data

(60) Provisional application No. 62/005,386, filed on May 30, 2014.

(51) Int. Cl.
*A47B 97/00* (2006.01)
*A47C 31/00* (2006.01)
*B62B 5/08* (2006.01)
*B60N 2/28* (2006.01)
*F16M 13/02* (2006.01)
*A47D 15/00* (2006.01)

(52) U.S. Cl.
CPC .............. *B62B 5/082* (2013.01); *B60N 2/28* (2013.01); *B60N 2/2806* (2013.01); *B60N 2/2845* (2013.01); *F16M 13/022* (2013.01); *A47D 15/005* (2013.01); *A47D 15/006* (2013.01); *B60N 2/2809* (2013.01); *B60N 2/2812* (2013.01); *B60N 2002/2815* (2013.01); *Y10T 29/49828* (2015.01)

(58) Field of Classification Search
CPC .................. B60N 2/2812; B60N 2002/2815; A47D 15/006; A47D 15/005
USPC ....... 297/463.1, 256.16, 467, 464, 483, 486; 280/33.992, 33.993; 248/328, 317
See application file for complete search history.

(56) References Cited

U.S. PATENT DOCUMENTS

| | | | | |
|---|---|---|---|---|
| 2,132,556 | A * | 10/1938 | Blackshaw | A47D 15/006 297/484 |
| 2,979,028 | A * | 4/1961 | Zakely | A62B 35/0018 182/3 |
| 4,758,048 | A * | 7/1988 | Shuman | A44B 11/06 24/200 |
| 5,267,680 | A * | 12/1993 | Torok | A47D 13/02 224/158 |
| 5,540,403 | A * | 7/1996 | Standley | B60R 22/105 24/579.11 |
| 5,813,367 | A * | 9/1998 | O'Brien | B64D 25/06 119/770 |
| 6,056,355 | A | 5/2000 | Klassen | |
| 7,144,085 | B2 * | 12/2006 | Vits | B60N 2/265 297/483 |
| 7,669,927 | B1 | 3/2010 | Zaid | |
| 2006/0108842 | A1 * | 5/2006 | Davis | A47C 7/66 297/184.13 |
| 2007/0176477 | A1 * | 8/2007 | Maciejczyk | B60N 2/2809 297/254 |
| 2008/0011545 | A1 * | 1/2008 | Turner | A62B 1/16 182/6 |
| 2008/0290707 | A1 * | 11/2008 | Schramek-Flye | A47D 1/103 297/255 |
| 2009/0127396 | A1 * | 5/2009 | Jordan | A62B 35/0018 244/151 R |
| 2010/0320821 | A1 * | 12/2010 | Trapp | A47D 13/107 297/274 |

(Continued)

Primary Examiner — Chi Q Nguyen
(74) Attorney, Agent, or Firm — Dicke, Billig & Czaja, PLLC

(57) ABSTRACT

An infant seat support assembly is disclosed for supporting an infant seat relative to a structure, such as a shopping cart.

14 Claims, 6 Drawing Sheets

(56) References Cited

U.S. PATENT DOCUMENTS

| | | | | |
|---|---|---|---|---|
| 2013/0162001 A1* | 6/2013 | Dignitti | ................ | A47D 15/006 |
| | | | | 297/467 |
| 2014/0021770 A1* | 1/2014 | Rivara | ................ | A47D 15/006 |
| | | | | 297/464 |
| 2015/0282636 A1* | 10/2015 | Wang | ................... | A47D 13/025 |
| | | | | 297/452.1 |

* cited by examiner

INFANT SEAT SUPPORT

CROSS REFERENCE TO RELATED APPLICATIONS

This application claims priority to provisional patent application number U.S. Ser. No. 62/005,386 filed on May 30, 2014, the contents of which are hereby incorporated by reference in their entirety.

BACKGROUND

When using a shopping cart with an infant seat (e.g., an infant car seat), users will place the infant seat in a basket or on a seat of the shopping cart. In both instances, safety of an infant in the infant seat is compromised. When placed in the basket, minimal space is provided to place items therein and the possibility exists of accidentally placing items on top of the infant. When placed on the seat, the infant seat can easily fall off the shopping cart or cause the entire shopping cart to be unstable and tip over.

DETAILED DESCRIPTION

Figure 1:
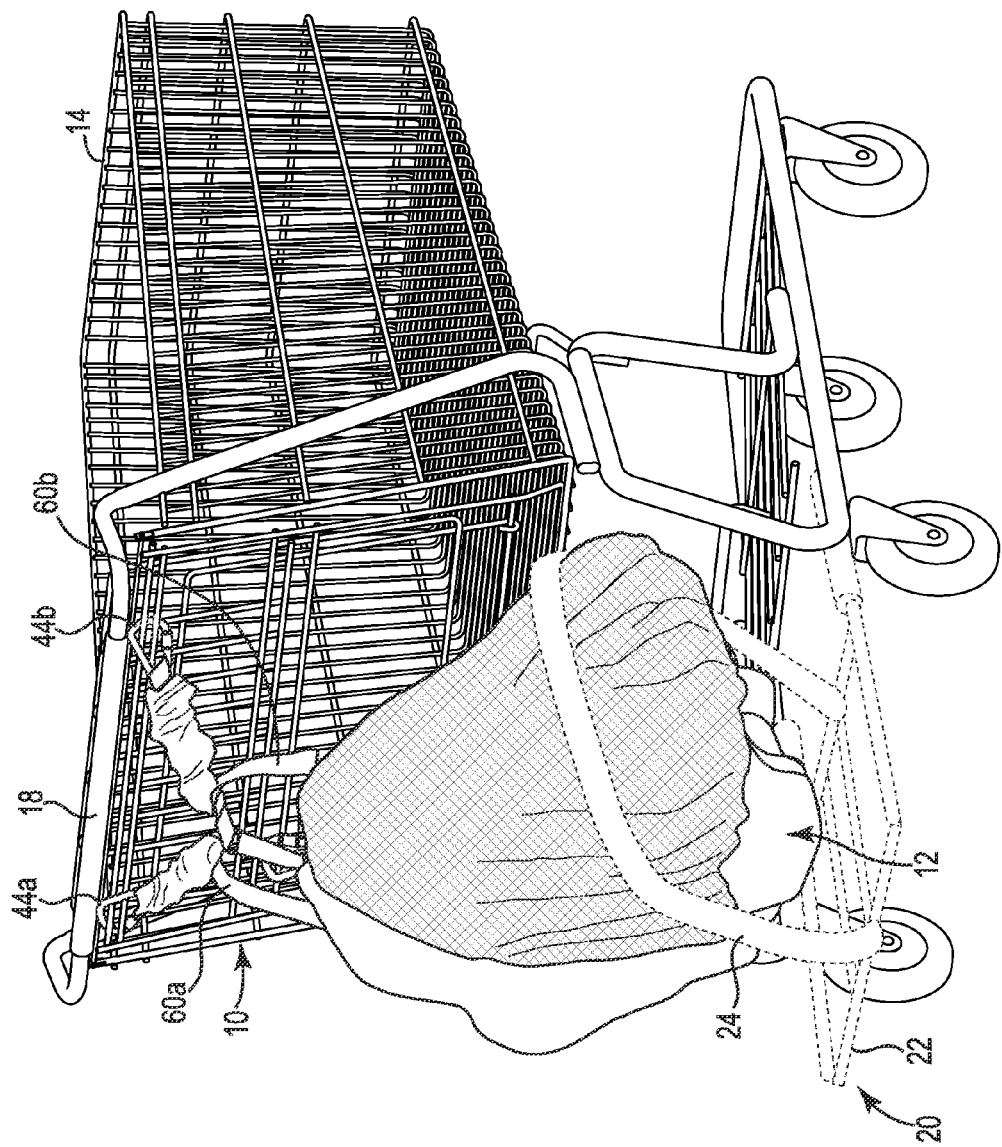
FIG. 1 is an isometric view showing connection of an infant seat to a shopping cart using an infant seat support.

FIG. 1 illustrates connection of an infant seat support assembly 10 connecting an infant car seat 12 to a shopping cart 14. One example infant car seat is disclosed in U.S. Pat. No. 7,669,927, the contents of which are hereby incorporated by reference in their entirety. The support assembly 10 is connected to the shopping cart proximate a handle 18 of the shopping cart 14 to suspend the infant car seat 12 above a surface where the shopping cart 14 is positioned. Alternatively, the support assembly 10 can be connected to different positions on the shopping cart such as either side or a front of the shopping cart 14. Regardless of a point of connection with the shopping cart 14, support assembly 10 is configured to support the infant car seat 12 as well as an infant occupying the car seat 12.

The handle 18 extends transverse to a basket of the shopping cart 14. With this arrangement, interference between legs of an operator pushing the cart 14 and the infant car seat 12 is minimized, if not altogether eliminated. Moreover, due to an angled configuration for a rear side of the basket, a center of gravity for the infant car seat 12 is located above rear wheels of the cart 14. As such, the cart 14 maintains sufficient stabilization, allowing an operator to push the cart 14 while using the basket and without tipping the cart 14 and thus compromise safety.

In an alternative embodiment, illustrated in phantom lines in FIG. 1, an alternative infant seat support assembly 20 can include a sliding platform 22 and a securing mechanism 24, herein embodied as a strap. When support assembly 20 is not in use, a user can slide the platform 22 under the basket of the cart 14 so as to be out of the way. The platform 22 is configured to receive and support the infant car seat 12 when the seat 12 is placed on the platform 22. Once placed on the platform 22, the securing mechanism 24 can secure the seat 12 to the platform 22 on either side, for example using a connection mechanism such as a buckle, caribiner, or other suitable connection mechanism.

Figure 2:
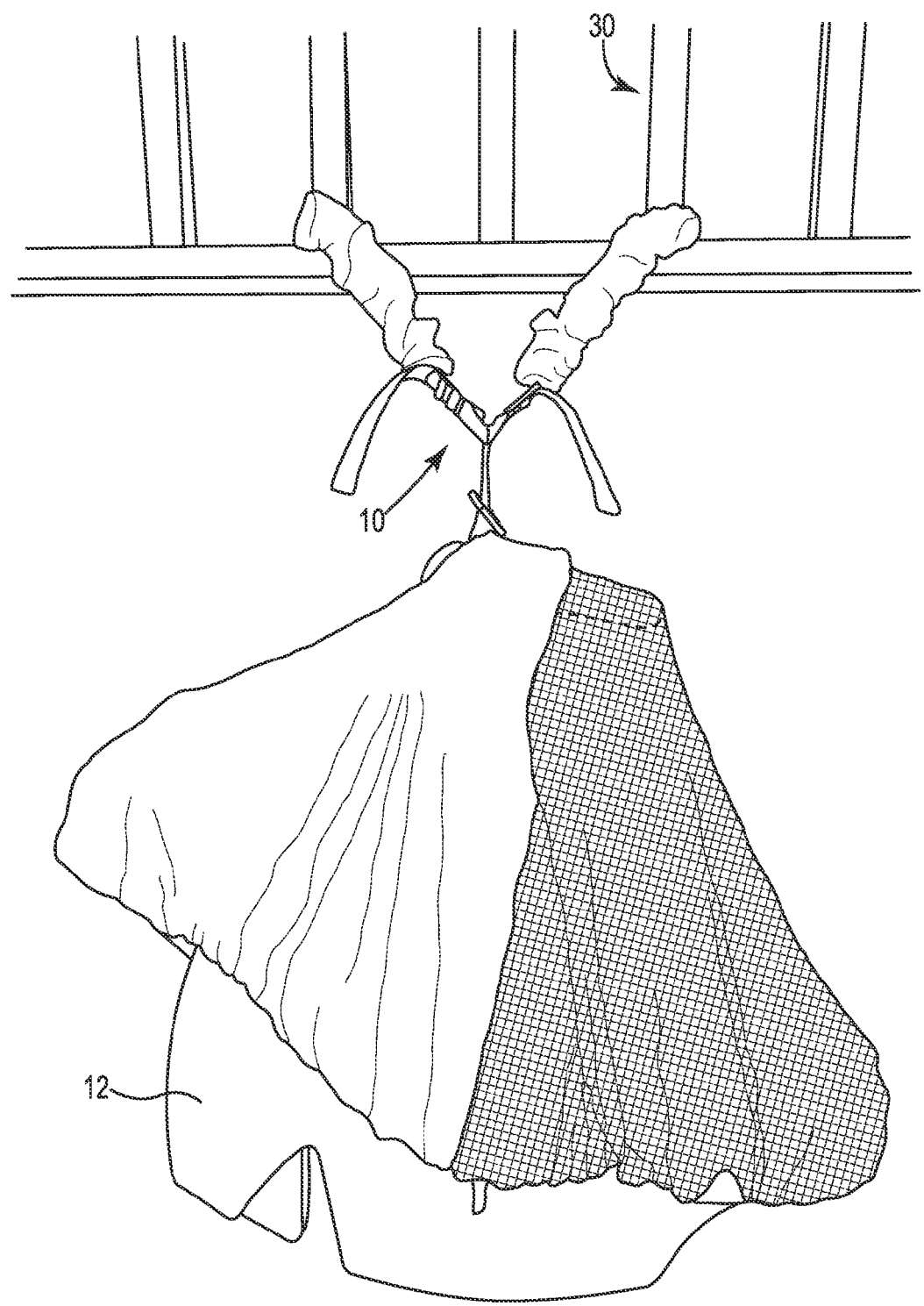
FIG. 2 is an illustration showing connection of an infant seat to an alternative support structure using an infant seat support.

In an alternative embodiment, as shown in FIG. 2, the infant support assembly 10 can be coupled to a different structure 30 (herein shown as a stair railing) in order to suspend the infant car seat 12 above ground. In such a scenario, a user can couple the support assembly 10 to the alternative structure 30 and push the infant car seat 12 from side to side so as to establish a swinging motion for the infant car seat 12. The alternative structure 30 can take various forms, such as the stair railing that is shown, a stand with sufficient structure to support the infant car seat 12 and/or a stroller-type structure that can support the infant car seat 12 during motion.

It will be appreciated that the support assembly 10 can be integrated into various structures and supports as desired. For example, the support assembly 10 can be integrated into the shopping cart 14 or alternative structure 30 as discussed above. For example, the support assembly 10 can include straps that are retractable into the shopping cart 14. To use the support assembly 10 in this embodiment, a user pulls on the straps and secures the support assembly 10 to the infant car seat 12. In an alternative embodiment, the support assembly 10 can be integrated into the infant car seat 12. In such an example, the infant car seat 12 can include a retractable mechanism such that the support assembly 10 can be retracted into the infant car seat 12.

Assembly 10 and/or 20 can be described as means for supporting an infant car seat above a surface when attached to a structure such as a shopping cart. In one embodiment, the means for supporting can include connectors that connect to the shopping cart 14 and to the infant car seat 12. In another embodiment, the means for supporting can include a platform 22 connected to the shopping cart and a strap 24 securing the infant car seat 12 to the platform 22.

Figure 3:
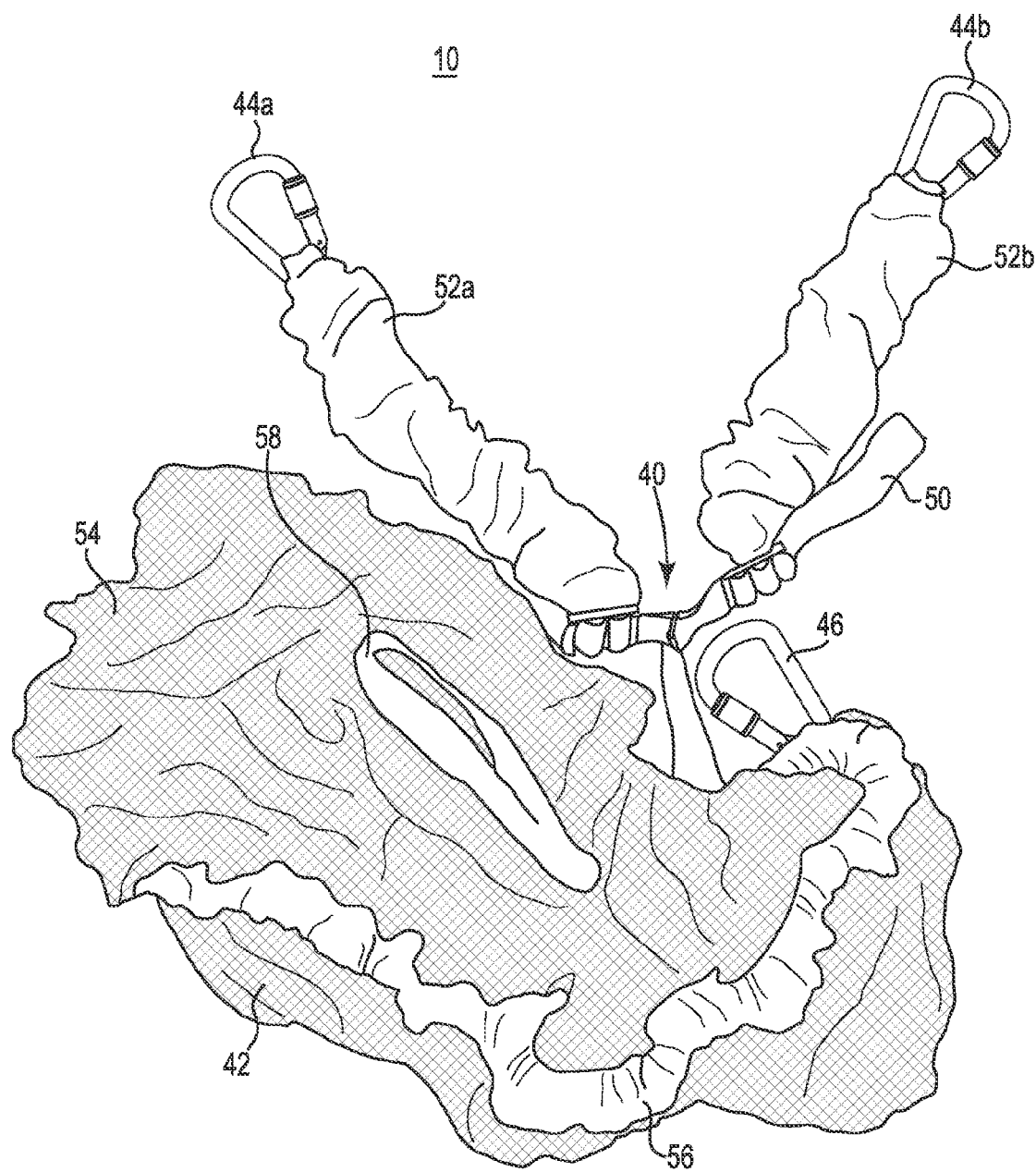
FIG. 3 is an illustration of an infant seat support assembly that includes an infant seat support and a cover.

FIG. 3 shows infant seat support assembly 10 that includes an infant seat support 40 and a seat cover 42 coupled with the support 40. As discussed in more detail below, the support 40 can be used to support the infant car seat 12 (FIG. 1) to an object or structure such as shopping cart 14. The cover 42 can be used to cover the infant car seat 12 and prevent items from contacting an infant within the infant car seat.

The support 40 includes first and second connectors 44a and 44b used to connect the support 40 to an object. In addition, the support 40 includes a third connector 46 used to connect the support 40 to the infant car seat (e.g., to a handle of the infant car seat). A strap assembly 50 provides connection among each of the connectors 44a, 44b and 46. In the illustrated embodiment, the support 40 further includes a pair of decorative sleeves 52a and 52b that cover a portion of the strap assembly 50. The sleeves 52a and 52b can be of various constructions, but in the illustrated embodiment comprise tubular fabric with elastic bands at either end. Alternatively, the strap assembly 50 (or portions thereof) can have a design imprinted on and/or within the strap assembly 50.

The cover 42 includes a main body 54 and a fastening element (herein embodied as an elastic band 56) defining a lower perimeter about the main body 54. The main body 54 can form a dome or tent-like shape that surrounds an opening of the infant car seat. A portion or an entirety of main body 54 can be formed of mesh or a mesh-like fabric that allows air to enter the infant car seat when the cover 42 is attached to the car seat. In addition, the main body 54 can be formed of a water proof material or other material with select properties as desired. Further still, a portion or an entirety of main body 54 can match the decorative sleeves 52a and 52b as desired.

The elastic band 56 surrounds the opening of the infant car seat and is capable of securing the cover 42 to the infant car seat. In other embodiments, the elastic band 56 can be any type of fastening element that assists in securing the main body 54 to the infant car seat. For example, the fastening element can be a drawstring, cinching mechanism, one or more snaps, one or more buttons, one or more zippers, etc. In the illustrated embodiment, the elastic band 56 includes a decorative sleeve that can match the decorative sleeves 52a and 52b as desired.

Positioned within the main body 54 of the cover 42 is an opening 58. The opening 58 allows for passage of connector 46 through the main body 54 such that connector 46 can be coupled with the infant car seat 12. As such, the opening is centrally located within the main body 54 so as to be proximate a handle of the infant car seat 12.

Figure 4:
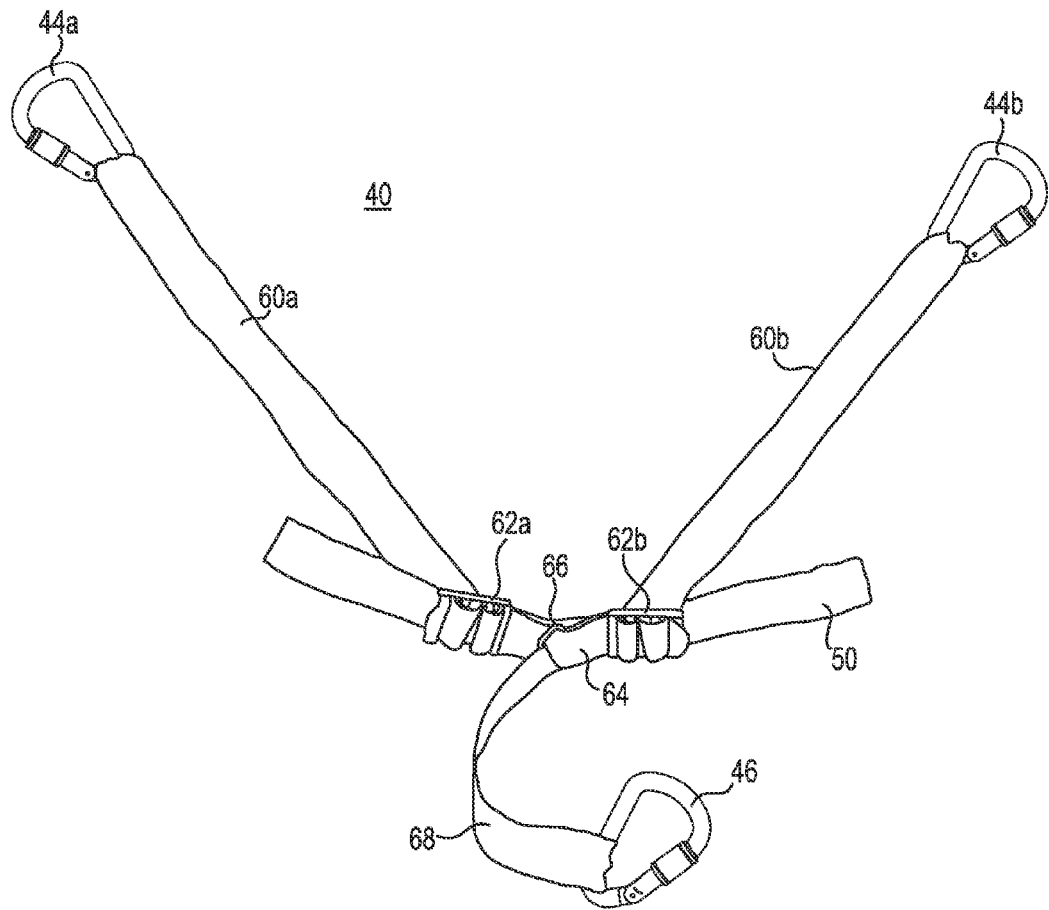
FIG. 4 is an illustration of the infant seat support shown in FIG. 3.

FIG. 4 shows the infant seat support 40 with decorative sleeves 52a and 52b removed. As shown, connectors 44a, 44b and 46 are embodied as caribiners, including a loop portion with a spring loaded gate. In one embodiment, the connectors 44a, 44b and 46 are formed of a suitable metal. In other embodiments, the connectors 44a, 44b and 46 can be formed of a polymer, composite or other suitable materials and structures. For example, the connectors 44a, 44b and 46 can be formed of metal, polymer, composite or other material and embodied as S-shaped hooks, L-shaped hooks, C-shaped hooks, U-shaped hooks, clips, straps, and other forms of connectors suitable to support an infant car seat.

Support 40, and in particular strap assembly 50, forms a Y-shaped configuration that includes upper straps 60a and 60b extending from respective connectors 44a and 44b at one end to adjustable mechanisms herein shown as buckles 62a and 62b at an opposite end. The strap assembly 50 can also take other shapes and/or configurations as desired, such as a V-shape, U-shape, I-shape, W-shape, etc. The buckles 62a and 62b are equipped with one or more mechanisms that can allow selective relative movement between the straps 60a, 60b and the buckles 62a, 62b such that a length of straps 44a, 44b from respective connectors 44a, 44b to buckle 62a, 62b is adjusted.

In one embodiment, the buckles 62a, 62b can include a ratchet mechanism used to adjust the length of straps 60a, 60b from connectors 44a, 44b to buckles 62a, 62b. In other embodiments, the buckles 62a, 62b can include a retractable mechanism (e.g., similar to a seat belt) for adjustment of the length. The buckles 62a, 62b can take various forms and be formed of metal, polymer or other materials of sufficient strength to support an infant car seat. In other examples, the buckles 62a, 62b can be cam buckles. In yet a further embodiment, buckles 62a, 62b can be eliminated entirely or other adjustable mechanism can be utilized such as apertures (e.g., formed within grommets positioned within upper straps 66a, 66b) coupled with a prong for positioning within one of the apertures.

An intermediate strap 64 is connected to the buckles 62a, 62b at either end and supports a connector 66 (herein embodied as a ring) that connects with a lower strap 68. Lower strap 48, in turn, is connected to connector 46. In one embodiment, lower strap 68 can include a buckle or similar mechanism to adjust a length of the lower strap 68 as measured from connector 46 to connector 66. In one embodiment, each of the straps 60a, 60b, 64 and 68 of strap assembly 50 are formed of flat nylon webbing of sufficient size and strength to support an infant car seat and an infant. As will be appreciated, strap assembly 50 can be formed of other materials as desired, such as cords, cables, bungee cords, chains, flexible metal, etc. Buckles 62a, 62b and ring 66 can be formed of a suitable material such as a polymer or metal and further be of sufficient strength to support an infant car seat and an infant.

During use and with further reference to FIG. 1, connectors 44a, 44b are coupled with an upper portion of the shopping cart 14, which can be a cross support, handle 18 or other structure. As shown, each of the connectors 44a, 44b are connected to either side of the shopping cart 14 proximate the handle 18, such that the infant car seat 12 is supported below the handle of the shopping cart. When embodied as caribiners as shown, connectors 44a, 44b can be of sufficient size to attach directly to shopping cart 14. In an alternative embodiment, connection between the support assembly 10 and shopping cart 14 can be provided in different ways. For example, the shopping cart 14 can include one or more hooks, caribiners or other mechanism that connects and supports the upper straps 60a, 60b. To this end, in one embodiment, the upper straps 60a, 60b can form a loop portion or other structure that can directly connect with a structure on the shopping cart 14. In addition, connectors 44a, 44b and strap assembly 50 can be attached to either side of cart 14, in front of cart 14 or any other area on cart 14 to accommodate safe holding of the infant car seat 12.

Figure 5:
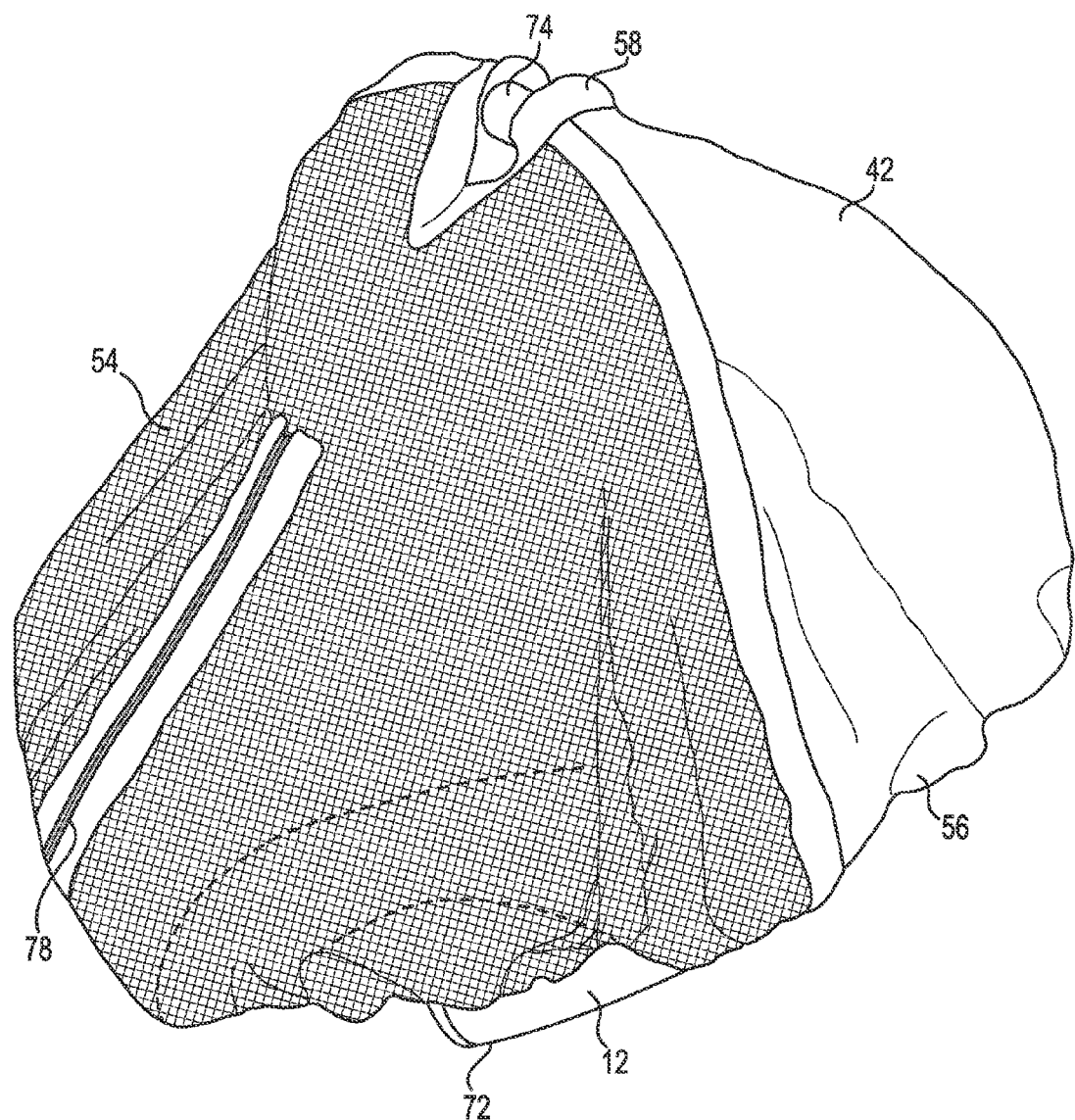
FIG. 5 is an illustration of the cover of FIG. 3 applied to an infant seat.

FIG. 5 shows the cover 42 assembled to an infant car seat 12, which illustratively includes a base 72 and an arm or handle 74 extending from the base 72. Keeping in mind that elastic band 56 can be embodied as any type of fastening element as discussed above, upon final assembly as illustrated, elastic band 56 surrounds a perimeter of the base 72 and is biased inward to secure the cover 42 to the infant car seat 12. In addition, the opening 58 is located so as to accommodate handle 74. In one embodiment and as illustrated, main body 54 includes a closure mechanism 78 (herein embodied as a zipper) to provide access to an interior of the infant car seat 12 when cover 42 is assembled to the infant car seat 12. The closure mechanism 78 can be other forms such as Velcro, buttons, snaps, etc.

Figure 6:
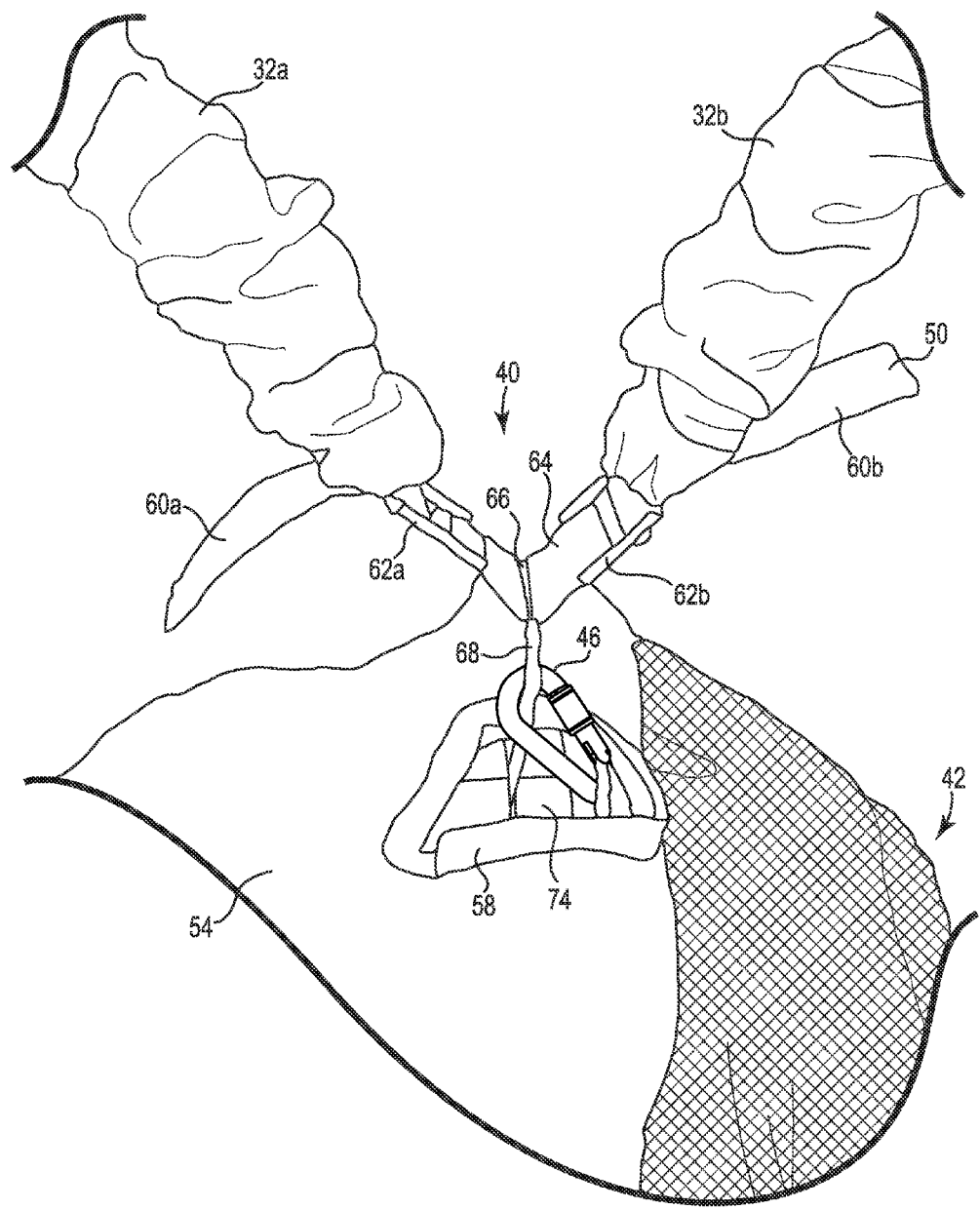
FIG. 6 is an illustration showing connection of an infant seat support to an infant seat.

FIG. 6 shows connection of the support 40 to the infant car seat 12. To attach the strap assembly 50 to infant car seat 12, connector 46 passes through opening 58 in main body 54 of cover 42. Connector 46 is then wrapped around the handle 74 of the infant car seat 12 and fed back through opening 58. Connector 46 can then be attached to lower strap 68. Other forms of connection can also be realized. For example, connector 46 can be secured to ring 66 or intermediate strap 64, thereby eliminating the need to utilize lower strap 68 for connection. Additionally, connector 46 can be of sufficient size to attach directly to handle 74, without strap 68 being wrapped around handle 74.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

What is claimed is:

1. An infant car seat support assembly, comprising:
a first upper strap having a first connector positioned at a first end of the first upper strap and a first adjustment mechanism positioned at a second end of the first upper strap, the second end opposite the first end;
a second strap having a second connector positioned at a third end of the second upper strap and a second adjustment mechanism positioned at a fourth end of the second upper strap, the fourth end opposite the third end;
an intermediate strap having a fifth end connected to the first adjustment mechanism and a sixth end connected to the second adjustment mechanism;
a lower strap having a seventh end connected to the intermediate strap and an eighth end, opposite the seventh end coupled with a third connector; wherein a fourth connector is connected to the intermediate strap and wherein the fourth connector is configured to provide adjustment of a length of the lower strap;
a cover configured to be positioned around an infant car seat.

2. The support assembly of claim 1, wherein each connector is formed of a loop portion and a spring loaded gate.

3. The support assembly of claim 1, wherein the lower strap is of sufficient length to wrap around a handle of an infant car seat.

4. The support assembly of claim 1, wherein the cover defines an opening for receiving the lower strap and the third connector.

5. The support assembly of claim 1, wherein the cover includes a fastening element configured to position the cover around a perimeter of an infant car seat.

6. The support assembly of claim 5, wherein the fastening element is an elastic band.

7. The support assembly of claim 1, wherein the intermediate strap includes a continuous piece of material extending from the first adjustment mechanism to the second adjustment mechanism.

8. An infant car seat support assembly, comprising:
a first upper strap having a first connector positioned at a first end of the first upper strap and a first adjustment mechanism positioned at a second end of the first upper strap, the second end opposite the first end;
a second strap having a second connector positioned at a third end of the second upper strap and a second adjustment mechanism positioned at a fourth end of the second upper strap, the fourth end opposite the third end;
an intermediate strap having a fifth end connected to the first adjustment mechanism and a sixth end connected to the second adjustment mechanism; wherein the intermediate strap includes a continuous piece of material extending from the first adjustment mechanism to the second adjustment mechanism; and
a lower strap having a seventh end connected to the intermediate strap and an eighth end, opposite the seventh end coupled with a third connector; wherein a fourth connector is connected to the intermediate strap and wherein the fourth connector is configured to provide adjustment of a length of the lower strap.

9. The support assembly of claim 8, wherein each connector is formed of a loop portion and a spring loaded gate.

10. The support assembly of claim 8, wherein the lower strap is of sufficient length to wrap around a handle of an infant car seat.

11. The support assembly of claim 8, further comprising a cover configured to be positioned around an infant car seat.

12. The support assembly of claim 11, wherein the cover defines an opening for receiving the lower strap and the third connector.

13. The support assembly of claim 11, wherein the cover includes a fastening element configured to position the cover around a perimeter of an infant car seat.

14. The support assembly of claim 13, wherein the fastening element is an elastic band.

* * * * *